June 1, 1937. C. B. GARWOOD 2,082,695
METHOD OF PRODUCING GLASS CONTAINERS
Filed May 4, 1935 3 Sheets-Sheet 1

Inventor
Charles B. Garwood

By C. A. Snow & Co.
Attorneys

June 1, 1937. C. B. GARWOOD 2,082,695
METHOD OF PRODUCING GLASS CONTAINERS
Filed May 4, 1935 3 Sheets-Sheet 2

Inventor
Charles B. Garwood
By CASnow & Co.
Attorneys

June 1, 1937.  C. B. GARWOOD  2,082,695
METHOD OF PRODUCING GLASS CONTAINERS
Filed May 4, 1935  3 Sheets-Sheet 3

Inventor
Charles B. Garwood
By C.A.Snow&Co.
Attorneys

Patented June 1, 1937

2,082,695

UNITED STATES PATENT OFFICE 2,082,695

METHOD OF PRODUCING GLASS CONTAINERS

Charles B. Garwood, Baltimore, Md., assignor to Carr-Lowrey Glass Co., Baltimore, Md.

Application May 4, 1935, Serial No. 19,881

2 Claims. (Cl. 49—80)

This invention relates to a new and improved method of producing glass containers whereby it is necessary to use only one mold for the formation of a finished article from a glass gob deposited in the mold, the method employed utilizing both the steps of pressing and blowing.

A further object of the invention is to utilize a method whereby a single mold can be used in the production of a finished container of that type having a small neck opening, such as a bottle or the like, the surfaces of the finished container being free of all blemishes which heretofore have been produced as a result of successive expansions of the outer surface portions of the container in any stage of production.

A still further object is to utilize a method which results in forcing the glass against all portions of the inner surfaces of the mold in which it is deposited thereby to insure a container of proper contour and free from blemishes, all portions of the outer surfaces being clearly defined so as to properly reproduce any designs to be displayed thereon.

I am aware that parisons have been produced in blank molds by pressing the glass in the mold with a plunger but as far as I am aware the parison when thus produced has not completely filled the blank mold as a result of the action of its pressing plunger. Consequently difficulty has been experienced in forcing the metal into the neck ring and into surface designs in the mold because of the tendency of the metal to back up around the plunger during the pressing operation. In an effort to overcome this disadvantage the step of utilizing air under pressure has been employed for supplementing the pressing action of a plunger in the parison but this added step has of necessity produced a parison shorter than the mold cavity in which it is formed. Consequently subsequent blowing operations through the neck of the parison following the withdrawal of the plunger have produced parisons defaced because of the added stretch necessary to completely fill the cavity. Where a parison has thus been produced it has been necessary subsequently to transfer it to a blow mold for the purpose of producing a finished article.

An object of the present invention is to simplify combined pressing and blowing methods heretofore used in the formation of bottles and other containers having small neck openings by using only one mold, employing a plunger for completely filling the mold with glass to accurately and clearly define all exterior surfaces of the container without the utilization of air under pressure, and for subsequently subjecting the pressed glass to the action of air admitted through the neck portion, thereby to obliterate the cavity formed by the withdrawn plunger used for pressing purposes and to form instead a bubble or cavity in the glass the capacity of which is predetermined by the size of the cavity initially formed by the plunger.

With the foregoing and other objects in view which will appear as the description proceeds, the invention resides in certain novel steps of the method hereinafter more clearly described and pointed out in the claims, it being understood that changes may be made in the method as disclosed without departing from the spirit of the invention as claimed.

For the purpose of clearly presenting the method there has been illustrated in the accompanying drawings one form of apparatus which may be used in carrying out the method although it is to be understood that ordinary glass blowing machines may be adapted readily for the purpose of performing the successive steps essential to the production of containers by the method constituting the present invention.

Figure 1:
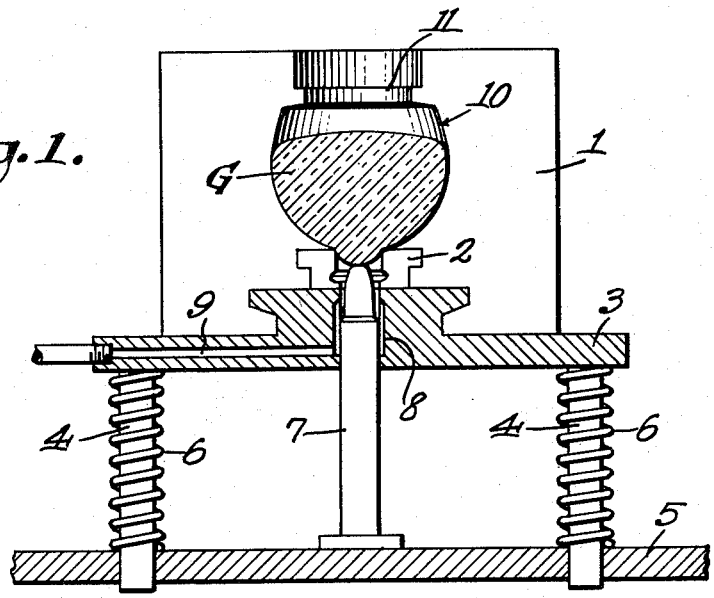
Figure 1 is a section through an apparatus supporting a mold in which a glass gob has been deposited preparatory to the initial pressing operation.

In carrying out the method constituting this invention there is provided a single mold 1 in which the glass gob is deposited and in which the finished article is produced. This mold can be mounted on any suitable support. For example and as shown in the drawings the mold, which has the usual neck ring 2, is mounted on a plate 3 having guide pins 4 mounted to slide in a support 5. Spring 6 on these pins serves to yieldingly support the plate 3 so that a fixed neck pin 7 carried by support 5 and extending through plate 3 is normally partly retracted from the neck ring 2.

An air chamber 8 is formed in the plate 3 around the neck pin and normally opens upwardly into the neck ring 2 and air under pressure is adapted to be supplied to this chamber from any suitable source through a passage 9.

The cavity 10 in the mold 1 is shaped to produce a finished article of the proper contour and with any desired surface designs. An opening 11 is provided in the center of the top of the mold and this opening is of such size as to permit a glass gob G to be dropped therethrough into the cavity 10 as shown in Figure 1.

Figure 2:
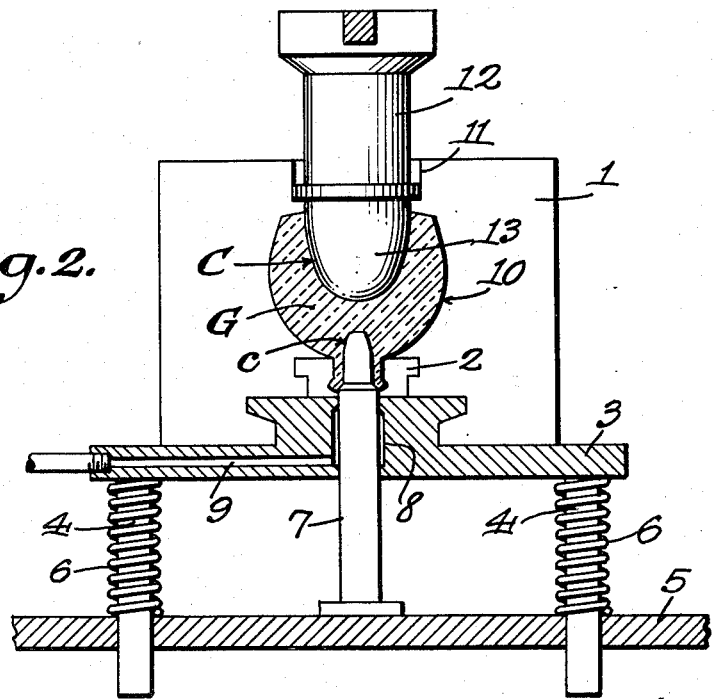
Figure 2 is a similar view showing the glass subjected to the pressing action of an inserted plunger whereby all portions of the exterior surface of the container and its neck portion, exclusive of a portion of the bottom, are sharply defined and properly finished.

After the gob has been deposited in the mold a plunger 12 is directed downwardly into the opening 11 so as to close it and penetrate the gob G. In the structure illustrated the plunger 12, when directed downwardly into the mold as shown in Figure 2 will cause the mold 1 to press on plate 3 and lower the plate so that the upper end of neck pin 7 will become positioned in the neck ring 2 and the lower portion of cavity 10. At the same time communication between chamber 8 and cavity 10 is cut off by the neck pin 7. The glass engaging portion 13 of plunger 12 and the glass engaging portion of the neck pin 7 are so proportioned that the glass displaced thereby during the foregoing operation will completely fill cavity 10 and neck ring 2 and press firmly against the surfaces of the mold and neck ring so that all surface designs appearing thereon will be accurately reproduced in the surface of the glass.

Figure 3:
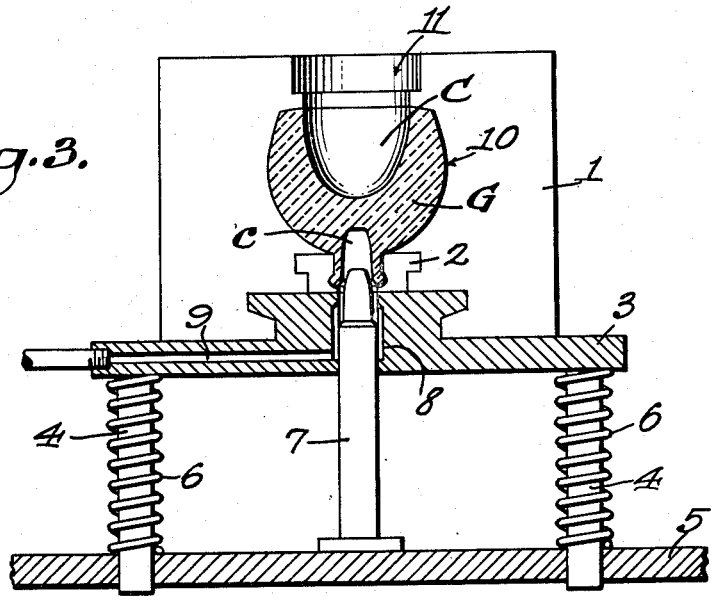
Figure 3 is a view similar to Figure 2, the plunger having been withdrawn and the neck pin disengaged from the neck portion.

Immediately following the foregoing operation plunger 12 is withdrawn from engagement with the pressed glass and mold 1 will rise so that pin 7 will be separated from the glass in the neck ring and communication established between chamber 8 and the cavity C produced in the glass by the neck pin. Thus the parts will assume the relative positions shown in Figure 3.

Figure 4:
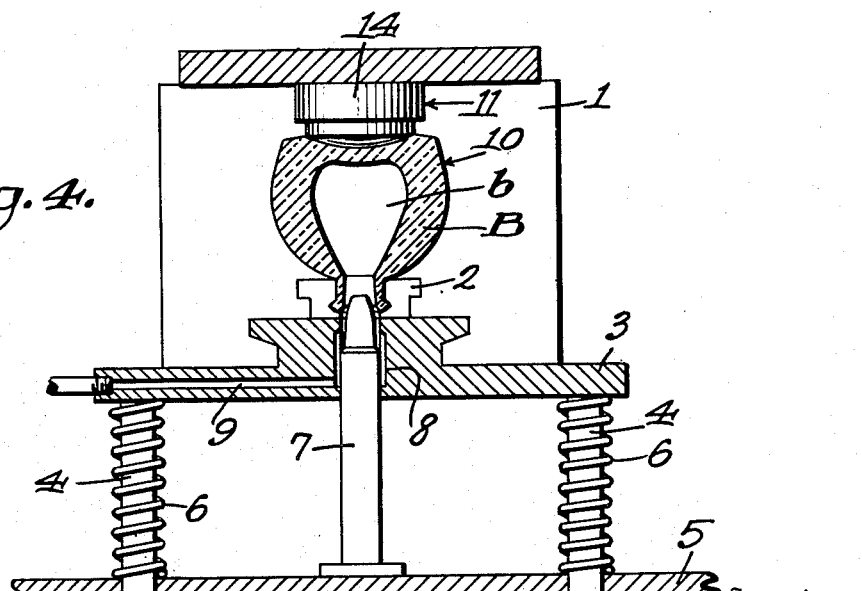
Figure 4 is a view similar to Figure 3 showing a baffle in position to close the opening in the mold through which the plunger had been withdrawn and also showing the container in its finished condition following the admission of air under pressure through the neck portion.
Figure 5:
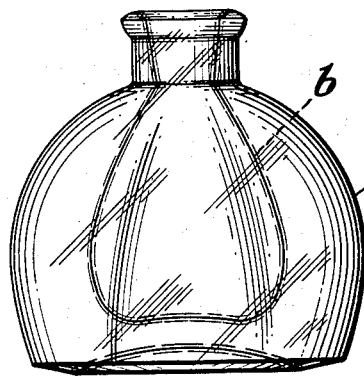
Figure 5 is a front elevation of a bottle produced in a single mold by the combined pressing and blowing operation constituting the present invention.
Figure 6:
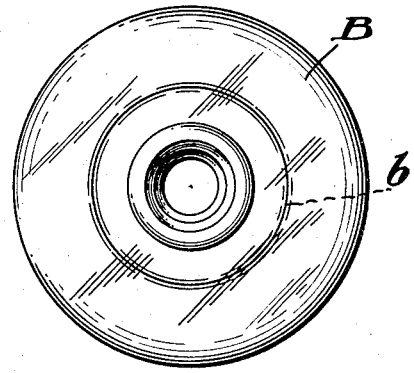
Figure 6 is a plan view thereof.

Thereafter a baffle 14 is applied in any suitable manner to the mold 1 so as to fill the opening 11 and provide an abutment against which the glass can be forced to form the central portion of the bottom of the finished container. Air is then directed under pressure into the chamber 8 and will flow into cavity c so that the cavity C which was produced in the glass by the end portion 13 of plunger 12 will be obliterated and the central portion of the partially shaped mass of glass within the mold will be forced against baffle 14 as shown in Figure 4, thereby leaving a bubble or cavity b in the finished bottle or container B the capacity of which is predetermined by the size of the cavity C produced by the end 13 of plunger 12. Immediately following this blowing action the mold 1 is opened and the container B completely finished, is removed therefrom.

Figure 7:
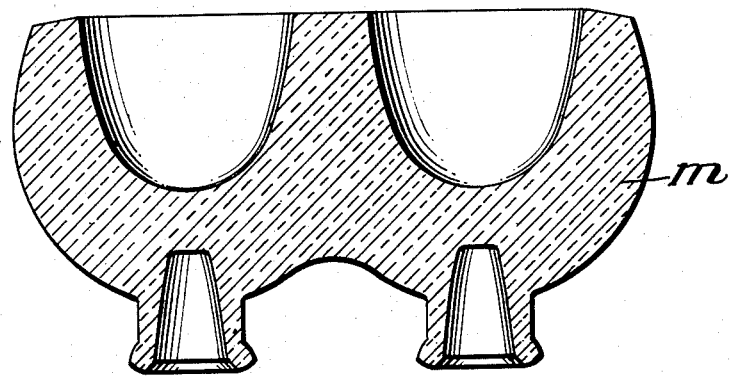
Figure 7 is a section through a partially finished container which can be produced through the use of a twin mold by means of the method herein described.
Figure 8:
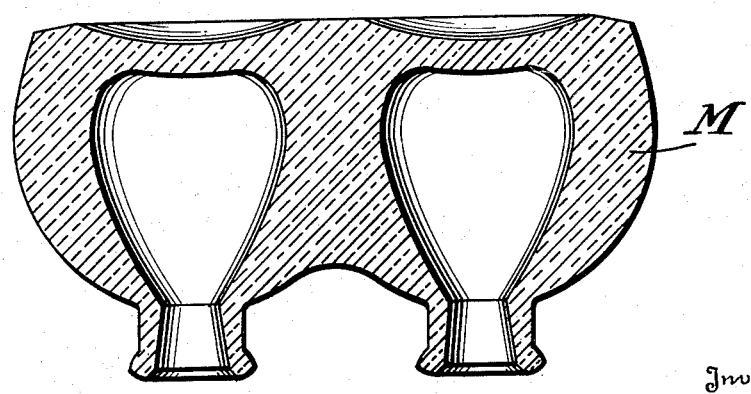
Figure 8 is a section through the finished multiple container, the same being shown inverted.

It will be understood that bottles and other containers of various sizes and shapes can be employed and obviously by utilizing a twin mold with one cavity, two neck rings, two neck pins, two plungers and two baffles all operating simultaneously in the same manner as the corresponding parts heretofore described, a multiple bottle such as shown at M in Figure 8 can be produced following the formation of an exteriorly shaped pressed blank such as shown at m in Figure 7.

Importance is attached to the fact that in the manufacture of a finished container by the method herein described only two steps are necessary following the deposit of the gob in the mold, namely, pressing the glass mass to shape all exterior surfaces except the center of the bottom, and thereafter blowing the pressed glass to shape the center of the bottom and produce a bubble or cavity of proper capacity. A further object resulting from this process is found in the fact that the exterior surfaces of the container are given a uniform finish because it is not necessary to subject these surfaces to successive expansions as has been the practice heretofore.

What is claimed is:

1. The method of producing glass containers which includes the steps of pressing a charge of glass in a mold to produce a partially finished article completely filling the mold and having a recess and completed exterior surfaces, and finally blowing the article in the same mold without stretching the mold engaging surfaces of the glass, thereby to displace the interior portion thereof into the recess to obliterate the recess and produce a cavity.

2. The method of producing a finished glass container in one mold which includes the steps of depositing a charge of glass in the mold, subjecting the charge to pressure from a plunger thereby expanding the charge and filling all portions of the mold to produce body and neck portions having clearly defined exterior surfaces in their finished condition, then withdrawing the plunger to leave a cavity in the glass equal in size to the cavity to be produced in the finished article, next closing the mold across the cavity, and finally blowing the glass through the neck portion to displace enough of the glass to obliterate the recess without stretching the mold engaging surfaces of the glass thereby to produce a cavity the volume of which is predetermined by the size of the recess.

CHARLES B. GARWOOD.